(12) United States Patent
Kang et al.

(10) Patent No.: US 11,542,573 B2
(45) Date of Patent: Jan. 3, 2023

(54) COPPER ALLOY FOR LASER CLADDING VALVE SHEET

(71) Applicants: HYUNDAI MOTOR COMPANY, Seoul (KR); KIA MOTORS CORPORATION, Seoul (KR)

(72) Inventors: Min-Woo Kang, Incheon (KR); Soon-Woo Kwon, Ansan-si (KR); Chung-An Lee, Hwaseong-si (KR); Seung-Hyun Hong, Seoul (KR); Young-Nam Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 268 days.

(21) Appl. No.: 16/786,063

(22) Filed: Feb. 10, 2020

(65) Prior Publication Data
US 2021/0115535 A1 Apr. 22, 2021

(30) Foreign Application Priority Data
Oct. 17, 2019 (KR) .......................... 10-2019-0129370

(51) Int. Cl.
| | |
|---|---|
| *C22C 9/06* | (2006.01) |
| *C22C 30/02* | (2006.01) |
| *B23K 26/352* | (2014.01) |
| *B23K 26/34* | (2014.01) |

(52) U.S. Cl.
CPC ................ *C22C 9/06* (2013.01); *C22C 30/02* (2013.01); *B23K 26/34* (2013.01); *B23K 26/352* (2015.10)

(58) Field of Classification Search
CPC ........... C22C 9/06; C22C 30/02; B23K 26/34; B23K 26/352; B23K 35/302; B23K 20/008; F01L 2820/01; F01L 3/04; F02B 77/02
See application file for complete search history.

(56) References Cited

U.S. PATENT DOCUMENTS

| | | | | |
|---|---|---|---|---|
| 4,818,307 A * | 4/1989 | Mori | ..................... | B23K 35/302 |
| | | | | 148/414 |
| 5,188,799 A * | 2/1993 | Mori | ..................... | B23K 35/302 |
| | | | | 148/414 |
| 7,850,795 B2 * | 12/2010 | Kawasaki | ................. | F01L 3/04 |
| | | | | 148/414 |
| 2017/0037495 A1 * | 2/2017 | Kawasaki | ................. | C22C 9/06 |
| 2018/0272472 A1 * | 9/2018 | Aoyama | .............. | B23K 26/342 |

FOREIGN PATENT DOCUMENTS

| | | | | |
|---|---|---|---|---|
| CN | 108624878 A | 10/2018 | | |
| EP | 1120472 A2 * | 8/2001 | ........... | B23K 35/302 |
| JP | 2004-005066 A | 1/2004 | | |

* cited by examiner

*Primary Examiner* — Alexandra M Moore
(74) *Attorney, Agent, or Firm* — McDonnell Boehnen Hulbert & Berghoff LLP (57) ABSTRACT

A composition of a copper alloy for a laser cladding valve sheet is disclosed. The copper alloy includes a matrix structure and a hard phase, which includes 12 to 24 wt % of Ni, 2 to 4 wt % of Si, 8 to 30 wt % of Fe, more than 5 wt % and less than 10 wt % of Mo, 2 to 10 wt % of Al, and the balance Cu. The interfacial delamination may be suppressed in a fatigue environment by micronizing the hard phase and the distribution thereof, thereby improving fatigue resistance and wear resistance.

1 Claim, 6 Drawing Sheets

COPPER ALLOY FOR LASER CLADDING VALVE SHEET

CROSS REFERENCE TO RELATED APPLICATIONS

This application claims priority under 35 U.S.C. § 119 to Korean Patent Application No. 10-2019-0129370, filed on Oct. 17, 2019, in the Korean Intellectual Property Office, the disclosure of which is incorporated herein by reference in its entirety.

BACKGROUND

1. Field

The present disclosure relates to a copper alloy for a laser cladding valve sheet, and more particularly, to the composition of a copper alloy.

2. Description of the Related Art

Since it is difficult for an engine block made of an aluminum (Al) material alone to withstand the combustion explosion, heat and mechanical impact transmitted from an engine valve, a valve sheet manufactured of an Fe-based powder sintered material has been used by being pressed into an engine block, and recently, a method for directly cladding a Cu-based valve sheet on an engine block by a laser cladding preparation method has been used in order to improve heat resistance and wear resistance.

Since an engine valve sheet should withstand contact and friction with a valve, exposure to exhaust gases, and the like, heat resistance, thermal fatigue, thermal conductivity, wear resistance, and the like are required. In a laser cladding valve sheet in the related art, Cu is used as a base element in order to satisfy heat resistance, a Cu—Ni—Si alloy-based material in which a nickel-based silicide ($Ni_xSi_y$) is utilized by adding Ni—Si is applied in order to improve wear resistance, and a spherical hard phase composed of two or more of Fe, Mo, W, Co, and Cr, or a carbide phase such as V and Nb is formed in order to further compensate for wear resistance. More specifically, a matrix structure (hardness: about 200 to 300 Hv) composed of Cu and $Ni_xSi_y$ with an fcc structure is additionally composed of an alloy element such as Fe, Mo, W, Co, Cr, and V, and a Mu phase which is an Fe—Mo-rich phase or a spherical high-hardness hard phase (hardness: about 700 to 900 Hv) having a Laves phase is intentionally formed.

However, due to contact and friction with valves, cracks occur between a matrix structure and a hard phase interface under mechanical and thermal fatigue conditions. This is because due to the high variation in hardness between the matrix structure and the hard phase, a local stress occurring in a fatigue environment is concentrated at the interface, but the size of the hard phase is about the several hundred μm, which is coarse, and thus, the stress cannot be effectively dispersed.

SUMMARY

The present disclosure has been made in an effort to improve fatigue resistance and wear resistance by micronizing the hard phase.

An exemplary embodiment of the present disclosure provides a copper alloy including a matrix structure and a hard phase, in which the copper alloy includes 12 to 24 wt % of Ni, 2 to 4 wt % of Si, 8 to 30 wt % of Fe, more than 5 wt % and less than 10 wt % of Mo, 2 to 10 wt % of Al, and the balance Cu, and the technical feature is that Fe and Al are added in order to lower the formation temperature of the hard phase.

According to the present disclosure, the interfacial delamination may be suppressed in a fatigue environment by micronizing the hard phase and the distribution thereof, thereby improving fatigue resistance and wear resistance.

According to the present disclosure, the cost can also be reduced by using Fe and Al which are inexpensive elements.

DETAILED DESCRIPTION

Hereinafter, the present disclosure will be described in detail. However, the present disclosure is not limited or restricted by exemplary embodiments, objects and effects of the present disclosure will be naturally understood or become apparent from the following description, and the objects and effects of the present disclosure are not limited by only the following description. Further, in the description of the present disclosure, when it is determined that the detailed description for the publicly-known technology related to the present disclosure can unnecessarily obscure the gist of the present disclosure, the detailed description thereof will be omitted.

For the process of forming a matrix structure and a hard phase, the following description may be referenced. A five-membered liquid single phase of Cu—Ni—Si—Fe—Mo is separated into a Cu-rich liquid phase (including small amounts of Si and N, hereinafter, referred to as a liquid phase $L_1$) and a Fe—Mo-rich liquid phase (hereinafter, referred to as a liquid phase $L_2$), and the liquid phase $L_1$ and the liquid phase $L_2$ are solidified to form the matrix structure and the hard phase (particle), respectively. Since the size and distribution of the liquid phase $L_2$ are directly related to the size and distribution of the hard phase when the solidification is completed, the separation process of the liquid phase may be considered as a very important process.

The inventors of the present disclosure confirmed the formation process of the hard phase, and as a result, found that as the temperature is decreased in a liquid single phase state, the separation of a composition occurs in a liquid phase separation form as the solid solubility limits of the aforementioned hard phase-forming elements which may be solid-solubilized in liquid copper are lowered, and the hard phase is formed at high temperature because an increase in content of Co (1495° C.), Mo (2623° C.), W (3422° C.), V (1910° C.), and Cr (1907° C.) which are elements whose melting point is relatively high among elements constituting alloy powders in the related art increases the hard phase formation temperature and liquid phase separation temperature, and consequently, the size of the hard phase becomes coarse. Accordingly, the present disclosure utilizes Fe (1538° C.) having a relatively low melting point as a hard phase-forming element without adding Co, W, V, and Cr which are elements whose melting point is relatively high, the size of the hard phase is micronized by adding a low-melting point element Al (660° C.) in an amount of 2 to 10 wt % to an alloy system to lower the hard phase formation temperature, and the interfacial delamination is effectively suppressed in a fatigue environment. Meanwhile, the variation in hardness between the matrix structure and the hard phase may be reduced by adding Mo in an amount of less than 4 wt % and omitting the addition of Co, W, V, and Cr, but there occurs a problem in that the wear resistance is decreased due to a decrease in fraction of the hard phase, the addition of 5 to 9 wt % Mo and 8 to 30 wt % Fe whose amounts are slightly increased may increase the fraction of the hard phase, but the coarsening of 100 μm or more of the hard phase occurs, and thus is solved by adding 2 to 10 wt % of Al.

Accordingly, the present disclosure is a copper alloy for a laser cladding valve sheet, including a matrix structure and a hard phase, which is characterized by including 12 to 24 wt % of Ni, 2 to 4 wt % Si, 8 to 30 wt % of Fe, more than 5 wt % and less than 10 wt % of Mo, 2 to 10 wt % of Al, and the balance Cu. Furthermore, it is also characterized in that Fe and Al are added in order to lower the formation temperature of the hard phase. The matrix structure has a dendritic structure through Cu and a nickel-based silicide with anfcc structure, and the hard phase may be a Mu phase or a Laves phase which is a Fe—Mo rich phase, and the two phases may be mixed. Fe and Mo play an important role in forming the two phases. The detailed significance of addition of alloy elements included in the present invention is as follows.

(1) Ni

Ni serves to form a Cu—Ni—Si-based solidification structure, form a nickel-based silicide, and improve the strength of a clad layer, and is added in an amount of 12 to 24 wt %. When Ni is added in an amount of less than 12 wt %, the strength and wear resistance of the clad layer deteriorate, and when Ni is added in an amount of more than 24 wt %, the bondability of the interface between an Al cylinder block and a clad layer is decreased.

(2) Si

Si serves to form a Cu—Ni—Si-based solidification structure, form a nickel-based silicide, and improve the bondability of the interface between an Al cylinder block and a clad layer, and is added in an amount of 2 to 4 wt %. When Si is added in an amount of less than 2 wt %, the bonding strength of the interface between an Al cylinder block and a clad layer interface is decreased, and the nickel-based silicide is insufficient or is not formed, and when Si is added in an amount of more than 4 wt %, the fraction of a Cu—Ni—Si-based solidification structure is increased, which causes a decrease in ductility of a matrix structure of the clad layer and the occurrence of cracks on the clad layer.

(3) Fe

Fe serves to form a hard phase and increase wear resistance, and is added in an amount of 8 to 30 wt %. When Fe is added in an amount of less than 8 wt %, wear resistance deteriorates due to a decrease in fraction of the hard phase, and when Fe is added in an amount of more than 30 wt %, the hard phase becomes coarse, and brittleness occurs.

(4) Mo

Mo serves to form a hard phase and increase wear resistance, and is added in an amount of more than 5 wt % and less than 10 wt %. When Mo is added in an amount of 5 wt % or less, wear resistance deteriorates due to a decrease in fraction of the hard phase, and when Mo is added in an amount of 10 wt % or more, the hard phase becomes coarse, and brittleness occurs.

(5) Al

Al serves to strengthen a solid solution, and is added in an amount of 2 to 10 wt %. When Al is added in an amount of less than 2 wt %, the hard phase becomes coarse, and when Al is added in an amount of more than 10 wt %, an intermetallic compound such as NiAl and CuAl is formed, and brittleness occurs.

TABLE 1

| Classification | Cu | C | Ni | Si | Cr | Co | Fe | Al | Mo | W | V or Nb |
|---|---|---|---|---|---|---|---|---|---|---|---|
| Example 1 | Bal. | 0 | 16 | 2.5 | 0 | 0 | 10 | 4 | 6 | 0 | 0 |
| Conventional Material 1 | Bal. | 0 | 17 | 3 | 0 | 1 | 9 | 0 | 15 | 0 | 0 |
| Conventional Material 2 | Bal. | 0 | 17 | 3 | 0 | 0 | 10 | 0 | 3 | 5 | 0 |
| Conventional Material 3 | Bal. | 0 | 17 | 3 | 8 | 0 | 10 | 0 | 3 | 0 | 0 |
| Conventional Material 4 | Bal. | 0 | 17 | 3 | 2 | 9 | 8 | 0 | 5 | 0 | 0 |
| Conventional Material 5 | Bal. | 0.1 | 17 | 3 | 2 | 3 | 8 | 0 | 4 | 0 | 4 |

TABLE 2

| Classification | Matrix structure Hardness (Hv) | Hard phase Hardness (Hv) | Variation in hardness (Hv) | Coarse hard phase | Wear thickness (μm) | Wear region (μm$^2$) |
|---|---|---|---|---|---|---|
| Example 1 | 264 | 683 | 419 | Not produced | 94 | 10,619 |
| Conventional Material 1 | 271 | 922 | 651 | Produced | 151 | 45,303 |
| Conventional Material 2 | 215 | 810 | 595 | Produced | 135 | 44,470 |
| Conventional Material 3 | 206 | 772 | 566 | Produced | 121 | 31,259 |
| Conventional Material 4 | 273 | 926 | 653 | Produced | 125 | 28,755 |
| Conventional Material 5 | 249 | 878 | 629 | Produced | 139 | 31,184 |

Table 1 is a table showing the compositions of Example 1 and Conventional Materials 1 to 5, and the unit is wt %. Example 1 and Conventional Materials 1 to 5 are common in that boron (B) and Mn are not included. When compared with Example 1, Conventional Material 1 is different from Example 1 because Mo is added in excess, Conventional Material 2 is different from Example 1 because W is added in excess, Conventional Material 3 is different from Example 1 because Cr is added in excess, Conventional Material 4 is different from Example 1 because Co is added in excess, and Conventional Material 5 is different from Example 1 because VC or NbC is formed in excess.

Table 2 shows the hardnesses of the matrix structures, hardnesses of the hard phases, the variations in hardness between the matrix structures and the hard phases, the presence and absence of production of a coarse hard phase, and the measurement of Wear thickness and Wear region in Example 1 and Conventional Materials 1 to 5. The variation in hardness between the matrix structure and the hard phase is preferably 500 Hv or less, and more preferably 480 Hv or less. The reference of the coarse hard phase is based on 100 μm, and when a hard phase of more than 100 μm is produced, "Produced" is shown, and when a hard phase of 100 μm or less is produced, "Not produced" is shown. Wear thickness indicates fatigue resistance, and is a result of measuring a reduced thickness of the cross-section of the valve sheet before and after the evaluation under a maximum load of 250 N, a maximum speed of 3,500 rpm, a heating method of an LPG burner, and a nitrogen atmosphere, and Wear thickness is preferably 110 μm or less, and more preferably 103 μm or less. Wear region indicates fatigue resistance, and is a result of measuring a reduced region (um$^2$) of the cross-section of the valve sheet under a load of 50 N, a temperature of 200° C., a stroke of 7 mm, a frequency of 6 Hz, and the air atmosphere for 10 minutes, and Wear region is preferably 15,000 μm$^2$ or less, and more preferably 13,000 μm$^2$ or less.

Figure 1A:
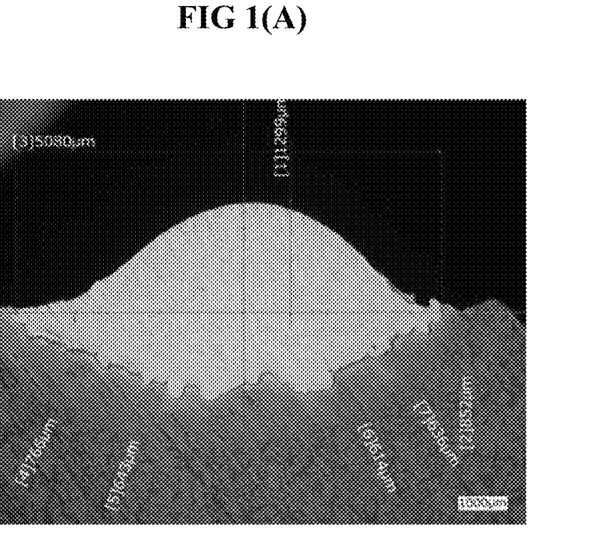
FIG. 1(A) is a photograph taken of a clad layer of Example 1.
Figure 1B:
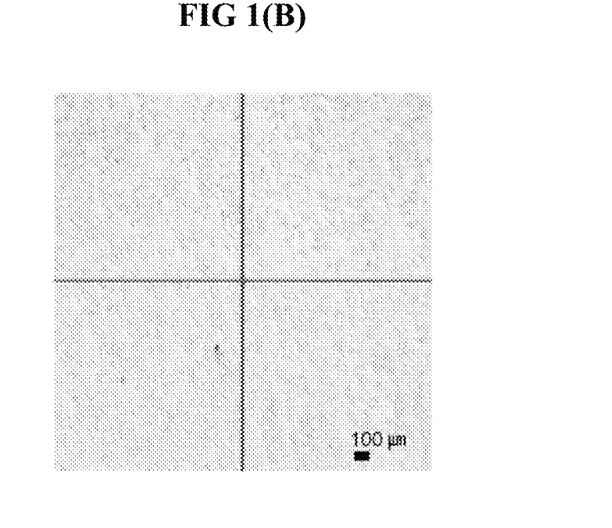
FIG. 1(B) is a photograph taken by enlarging the clad layer in FIG. 1(A).
Figure 2:
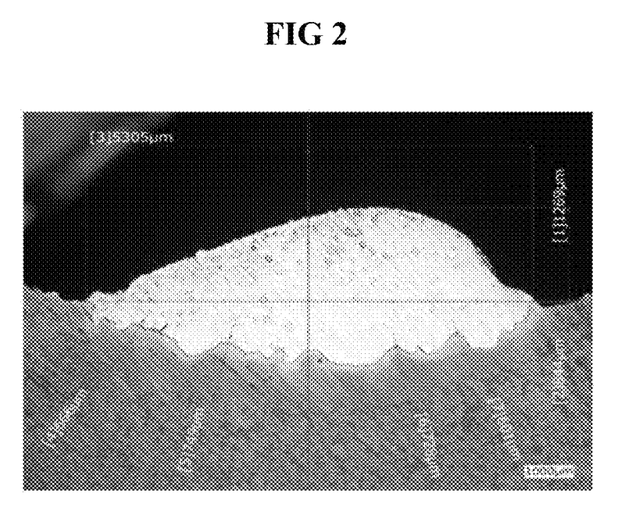
FIG. 2 is a photograph taken of a clad layer of Conventional Material 1.
Figure 3:
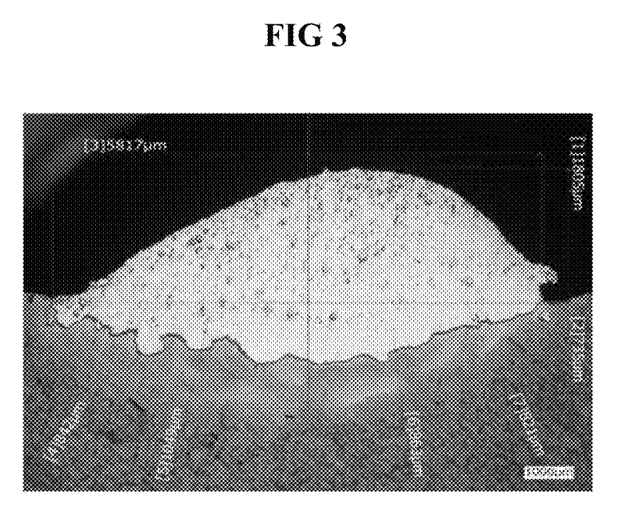
FIG. 3 is a photograph taken of a clad layer of Conventional Material 2.
Figure 4:
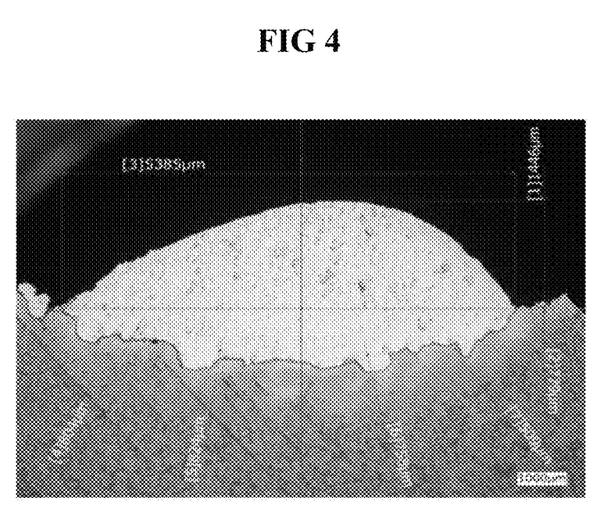
FIG. 4 is a photograph taken of a clad layer of Conventional Material 3.
Figure 5A:
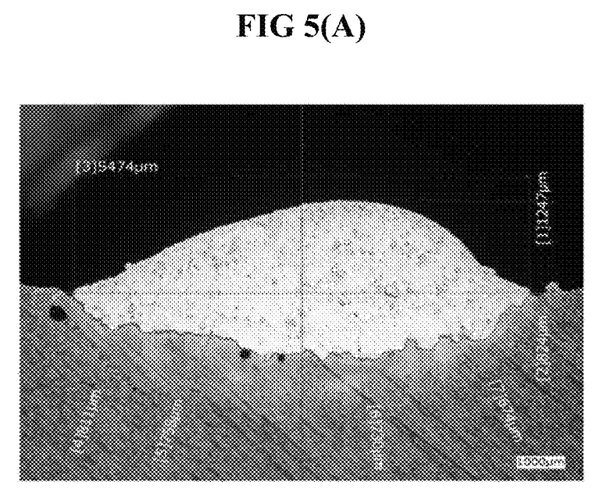
FIG. 5(A) is a photograph taken of a clad layer of Conventional Material 4.
Figure 5B:
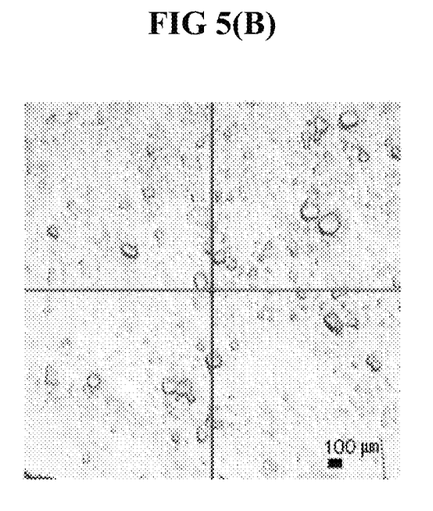
FIG. 5(B) is a photograph taken by enlarging the clad layer in FIG. 5(A).
Figure 6:
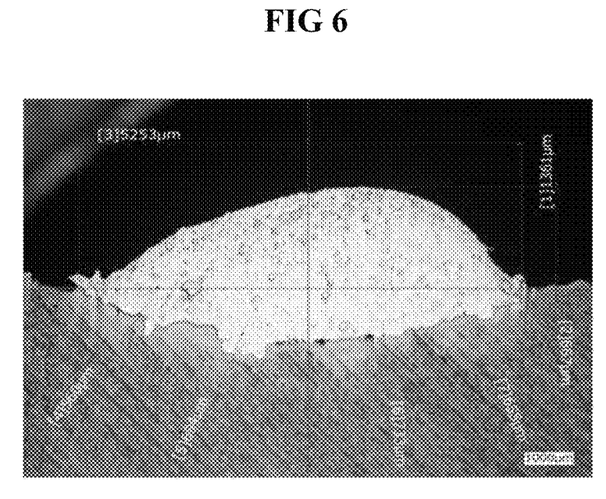
FIG. 6 is a photograph taken of a clad layer of Conventional Material 5.

FIG. 1(A) is a photograph taken of a copper alloy (which can be said to be a clad layer of Example 1, and FIG. 1(B) is a photograph taken by enlarging the clad layer in FIG. 1(A). FIGS. 2 to 6 are photographs taken of the clad layers of Conventional Materials 1 to 5. Referring to Tables 1 and 2 and FIGS. 1 to 6, it can be seen that the variation in hardness between the matrix structure and the hard phase and Wear thickness and Wear region in Example 1 are decreased as compared to Conventional Materials 1 to 5, and a coarse hard phase is not produced in Example 1. It can be confirmed whether the coarse hard phase is produced, for example, by comparing FIG. 1(B) and FIG. 5(B).

Figure 7:
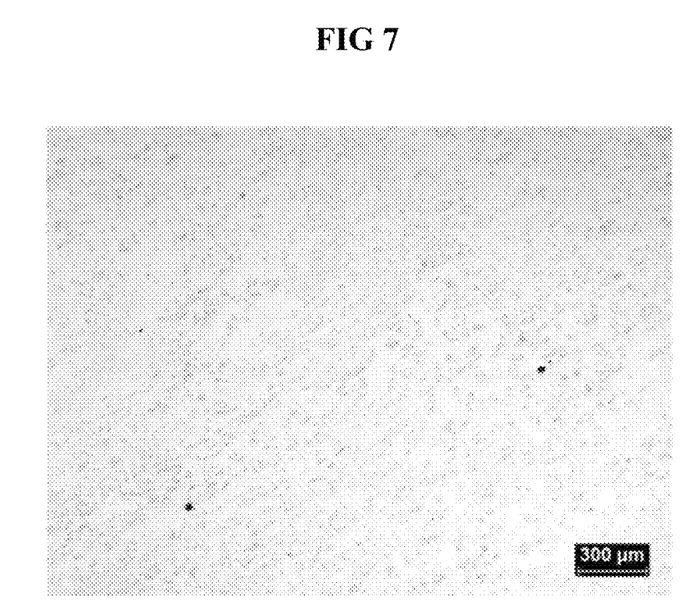
FIG. 7 is another photograph taken of a clad layer in Example 1.
Figure 8:
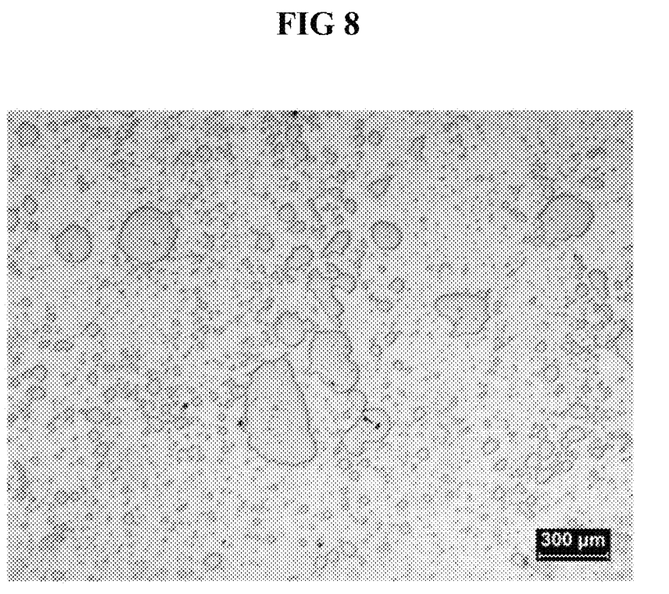
FIG. 8 is a photograph taken of a clad layer in Comparative Example 1.

FIG. 7 is another photograph taken by enlarging a clad layer in FIG. 1(A), and FIG. 8 is a photograph taken of a clad layer in Comparative Example 1. Comparative Example 1 has the same composition as in Example 1, except that 4 wt % of Al in Example 1 is not included (composition in Comparative Example 1: 16 wt % of Ni, 2.5 wt % of Si, 10 wt % of Fe, 6 wt % of Mo, and the balance Cu). Referring to FIGS. 7 and 8, it can be seen that the addition of Al plays an important role in non-production of the coarse hard phase.

TABLE 3

| Classification | Cu | Ni | Si | Fe | Al | Mo |
|---|---|---|---|---|---|---|
| Example 2 | Bal. | 16 | 2.5 | 24 | 2.1 | 6 |
| Example 3 | Bal. | 16 | 2.5 | 24 | 6 | 6 |
| Example 4 | Bal. | 16 | 2.5 | 24 | 10 | 6 |
| Example 5 | Bal. | 22 | 3.5 | 9 | 2.1 | 9 |
| Example 6 | Bal. | 22 | 3.5 | 9 | 6 | 9 |
| Example 7 | Bal. | 22 | 3.5 | 9 | 10 | 9 |
| Example 8 | Bal. | 13 | 2.2 | 13 | 4 | 5.5 |
| Example 9 | Bal. | 13 | 2.2 | 19 | 4 | 5.5 |
| Example 10 | Bal. | 13 | 2.2 | 25 | 4 | 5.5 |
| Example 11 | Bal. | 13 | 2.2 | 13 | 8 | 7.5 |
| Example 12 | Bal. | 13 | 2.2 | 19 | 8 | 7.5 |
| Example 13 | Bal. | 13 | 2.2 | 25 | 8 | 7.5 |

TABLE 4

| Classification | Cu | Ni | Si | Fe | Al | Mo |
|---|---|---|---|---|---|---|
| Comparative Example 2 | Bal. | 16 | 2.5 | 24 | 1.8 | 6 |
| Comparative Example 3 | Bal. | 16 | 2.5 | 24 | 10.5 | 6 |
| Comparative Example 4 | Bal. | 22 | 3.5 | 9 | 1.8 | 9 |
| Comparative Example 5 | Bal. | 22 | 3.5 | 9 | 10.5 | 9 |
| Comparative Example 6 | Bal. | 13 | 2.2 | 7 | 4 | 5.5 |
| Comparative Example 7 | Bal. | 13 | 2.2 | 31 | 4 | 5.5 |
| Comparative Example 8 | Bal. | 13 | 2.2 | 7 | 8 | 7.5 |
| Comparative Example 9 | Bal. | 13 | 2.2 | 31 | 8 | 7.5 |
| Comparative Example 10 | Bal. | 16 | 2.5 | 10 | 4 | 4.5 |
| Comparative Example 11 | Bal. | 16 | 2.5 | 10 | 4 | 10 |

Table 3 is a composition table of Examples 2 to 13, and Table 4 is a composition table of Comparative Examples 2 to 11. The unit of the numerical values shown in the two tables is wt %.

TABLE 5

| Classification | Matrix structure Hardness (Hv) | Hard phase Hardness (Hv) | Variation in hardness (Hv) | Coarse hard phase | Wear thickness (μm) | Wear region (μm$^2$) |
|---|---|---|---|---|---|---|
| Example 2 | 240 | 701 | 461 | Not produced | 102 | 12,912 |
| Example 3 | 255 | 721 | 466 | Not produced | 96 | 11,764 |
| Example 4 | 247 | 724 | 477 | Not produced | 99 | 12,316 |
| Example 5 | 240 | 720 | 480 | Not produced | 100 | 12,406 |
| Example 6 | 278 | 739 | 461 | Not produced | 95 | 11,003 |
| Example 7 | 271 | 743 | 472 | Not produced | 99 | 11,331 |
| Example 8 | 248 | 707 | 459 | Not produced | 96 | 10,377 |

TABLE 5-continued

| Classification | Matrix structure Hardness (Hv) | Hard phase Hardness (Hv) | Variation in hardness (Hv) | Coarse hard phase | Wear thickness (μm) | Wear region (μm²) |
|---|---|---|---|---|---|---|
| Example 9 | 268 | 748 | 480 | Not produced | 103 | 10,228 |
| Example 10 | 273 | 727 | 454 | Not produced | 99 | 12,103 |
| Example 11 | 228 | 684 | 456 | Not produced | 93 | 10,451 |
| Example 12 | 249 | 726 | 477 | Not produced | 101 | 10,855 |
| Example 13 | 254 | 709 | 455 | Not produced | 100 | 10,513 |

TABLE 6

| Classification | Matrix structure Hardness (Hv) | Hard phase Hardness (Hv) | Variation in hardness (Hv) | Coarse hard phase | Wear thickness (μm) | Wear region (μm²) |
|---|---|---|---|---|---|---|
| Comparative Example 2 | 200 | 714 | 514 | Produced | 113 | 18,641 |
| Comparative Example 3 | 233 | 735 | 502 | Produced | 121 | 23,380 |
| Comparative Example 4 | 219 | 734 | 515 | Produced | 107 | 25,420 |
| Comparative Example 5 | 270 | 773 | 503 | Produced | 106 | 25,170 |
| Comparative Example 6 | 222 | 731 | 509 | Produced | 115 | 28,093 |
| Comparative Example 7 | 251 | 755 | 504 | Produced | 122 | 31,883 |
| Comparative Example 8 | 242 | 672 | 430 | Produced | 118 | 29,517 |
| Comparative Example 9 | 263 | 730 | 467 | Produced | 114 | 40,911 |
| Comparative Example 10 | 253 | 684 | 431 | Not produced | 125 | 39,557 |
| Comparative Example 11 | 264 | 869 | 605 | Produced | 121 | 34,220 |

Tables 5 and 6 show the hardnesses of the matrix structures, hardnesses of the hard phases, the variations in hardness between the matrix structures and the hard phases, the presence and absence of production of a coarse hard phase, and the measurement of Wear thickness and Wear region in Example 2 to 13 and Comparative Examples 2 to 11, and the preferred variation in hardness, the reference for the coarse hard phase, the meaning of Wear thickness and Wear region, the measurement method, and the preferred wear amounts of Wear thickness and Wear region are as described above.

Referring to the composition and evaluation results of Example 1 in Tables 1 and 2 along with Tables 3 to 6, the variations in hardness in Examples 1 to 13 were measured to be less than 500 Hv, a coarse hard phase is not produced, and Wear thickness and Wear region were measured to be less than 110 μm and less than 15,000 μm². In the case of the Comparative Examples, a variation in hardness of more than 500 Hv was measured in the other Comparative Examples except for Comparative Examples 8, 9, and 10, and a coarse hard phase was produced in the other Comparative Examples (including Comparative Examples 8 and 9) except for Comparative Example 10. In the other Comparative Examples except for Comparative Examples 4 and 5, Wear thickness of more than 110 μm was measured, and in all the Comparative Examples (including Comparative Examples 4, 5, and 10), Wear region of more than 15,000 μm² was measured.

The present disclosure has been described in detail through representative Examples, but it is to be understood by a person with ordinary skill in the art to which the present disclosure pertains that various modifications are possible in the above-described Examples within the range not departing from the scope of the present disclosure. Therefore, the scope of the present disclosure should not be limited to the above-described Examples but should be determined by not only the claims to be described below but also all the changes or modified forms derived from the claims and the equivalent concept thereof.

The invention claimed is:

1. A copper alloy for a laser cladding valve sheet, comprising a matrix substrate and a hard phase,
wherein the copper alloy consists of 12 to 24 wt % of Ni, 2 to 4 wt % of Si, 8 to 30 wt % of Fe, 5.5 to 9 wt % of Mo, 2 to 10 wt % of Al, and the balance Cu;
wherein the hard phase has a particle size of 100 μm or less;
wherein a variation in hardness between the matrix structure and the hard phase is 500 Hv or less;
wherein a wear thickness is 110 μm or less; and
wherein a wear region is 15,000 μm² or less.

* * * * *